US008783751B2

(12) United States Patent
Bland et al.

(10) Patent No.: US 8,783,751 B2
(45) Date of Patent: Jul. 22, 2014

(54) COEXTRUDED ROOT DITCH MOLDING WITH HARD AND SOFT COMPONENTS INCLUDING ASSOCIATED FASTENER SYSTEM

(71) Applicant: U.S. Farathane Corporation, Auburn Hills, MI (US)

(72) Inventors: Wayne Bland, Fort Gratiot, MI (US); Kevin Charles Baxter, Goodrich, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 0 days.

(21) Appl. No.: 13/794,073

(22) Filed: Mar. 11, 2013

(65) Prior Publication Data
US 2014/0015269 A1 Jan. 16, 2014

Related U.S. Application Data

(60) Provisional application No. 61/669,732, filed on Jul. 10, 2012.

(51) Int. Cl.
*B60R 13/04* (2006.01)
*B60J 10/00* (2006.01)

(52) U.S. Cl.
CPC ............ *B60R 13/04* (2013.01); *B60J 10/0062* (2013.01); *B60J 10/008* (2013.01)
USPC ............ 296/1.08; 296/93; 296/213; 52/716.6

(58) Field of Classification Search
USPC .............. 296/1.08, 93, 95.1, 146.9, 210, 213; 428/31; 52/716.5, 716.6
See application file for complete search history.

(56) References Cited

U.S. PATENT DOCUMENTS

| | | | |
|---|---|---|---|
| 5,013,083 A | 5/1991 | Yada et al. | |
| 5,368,903 A * | 11/1994 | Trier | ............................... 428/31 |
| 6,210,615 B1 | 4/2001 | Yoshizuru et al. | |
| 6,224,145 B1 | 5/2001 | Sugiura | |
| 6,684,574 B2 | 2/2004 | Hayashi | |
| 6,974,181 B2 * | 12/2005 | Mikkaichi et al. | ............ 296/210 |
| 7,004,535 B1 * | 2/2006 | Osterberg et al. | ........ 296/203.03 |
| 7,004,537 B2 | 2/2006 | Unger et al. | |
| 7,029,060 B1 | 4/2006 | Osterberg et al. | |
| 7,045,189 B2 | 5/2006 | Hui et al. | |
| 7,401,395 B2 | 7/2008 | Unger et al. | |

(Continued)

FOREIGN PATENT DOCUMENTS

EP 386986 A1 * 9/1990
EP 0857615 A1 8/1998

(Continued)

*Primary Examiner* — Glenn Dayoan
*Assistant Examiner* — Jason S Daniels
(74) *Attorney, Agent, or Firm* — Gifford, Krass, Sprinkle, Anderson & Citkowski, P.C.; Douglas J. McEvoy

(57) ABSTRACT

A coextruded molding for mounting within a vehicle roof ditch having an elongated trim defining component constructed of a first material and a structurally supporting component constructed of a second harder material coextruded along a surface of the first material. The structural supporting component includes a main body terminating at inwardly angled ends so as to define an extending track. A plurality of fasteners are seated within the track for mounting the molding to the vehicle roof ditch.

4 Claims, 6 Drawing Sheets

(56) References Cited

U.S. PATENT DOCUMENTS

| | | |
|---|---|---|
| 7,604,287 B2 | 10/2009 | Mourou |
| 7,621,574 B2 | 11/2009 | Mourou et al. |
| 7,837,257 B2 | 11/2010 | Kuntze et al. |
| 8,070,204 B2 * | 12/2011 | Mourou .................. 296/1.08 |
| 2007/0182214 A1 * | 8/2007 | Okabe et al. ................ 296/210 |
| 2008/0277973 A1 | 11/2008 | Mourou |
| 2009/0021053 A1 * | 1/2009 | Harberts et al. ............. 296/213 |
| 2009/0102241 A1 * | 4/2009 | Harberts et al. ............. 296/213 |
| 2010/0180536 A1 | 7/2010 | Reznar |
| 2010/0196629 A1 | 8/2010 | Mourou et al. |
| 2011/0010898 A1 | 1/2011 | Scroggie et al. |
| 2012/0068488 A1 | 3/2012 | Mourou |
| 2013/0234474 A1 * | 9/2013 | Coakley et al. ............... 296/210 |

FOREIGN PATENT DOCUMENTS

| | | |
|---|---|---|
| JP | 09150683 A | 6/1997 |
| JP | 2003040042 A | 2/2003 |
| JP | 2003182466 A | 7/2003 |
| JP | 2007302171 A | 11/2007 |
| JP | 2010501384 A | 1/2010 |
| JP | 4722765 B2 | 7/2011 |

* cited by examiner

COEXTRUDED ROOT DITCH MOLDING WITH HARD AND SOFT COMPONENTS INCLUDING ASSOCIATED FASTENER SYSTEM

CROSS-REFERENCE TO RELATED APPLICATIONS

This Application claims the benefit of U.S. Provisional Application 61/669,732 filed on Jul. 10, 2012, the contents of which is incorporated herein in its entirety.

FIELD OF THE INVENTION

The present invention is a coextruded roof ditch molding including both hard and soft components. Specifically, the molding includes an outer flap exhibiting a softer plastic flap or covering material coextruded in a single shot process with a harder and structural supporting thermoplastic further exhibiting an inwardly facing track or channel. A plurality of mounting fasteners seat within the track and assist in mounting the molding to a conventional vehicle roof ditch recess.

BACKGROUND OF THE INVENTION

Vehicle roof ditch moldings are known in the art, one example of which is set forth in U.S. Pat. No. 7,621,574, issued to Mourou et al. and which teaches a vehicle ditch molding for insertion and retention in a vehicle roof ditch recess. Features associated with the molding include a head extending outward from a ditch molding centerline and which is configured to cover an opening to the recess.

A stem extends from the head along the centerline and is configured to be narrower than the opening to the recess. A pair of wings extend outward from the stem in opposed directions relative to the ditch molding centerline. Each of the wings has an upper surface facing the head and an opposed lower surface, as well as each having a wing lower notch extending into the wing lower surface and defining an inner living hinge extending between the respective wing lower notch and corresponding upper surface.

US 2012/0068488, also to Mourou, teaches a retaining clip for a ditch molding having a head with left and right wings that lap onto the roof. A stem depends from the head and an enlarged foot is located at a lower end of the stem. A molding clip includes a base mounted in the ditch and left and right biasing arms having wedge faces that engage with the foot to urge the foot downwardly into the ditch in an installed position of the molding.

The left and right biasing arms yield away from each other upon an upward movement of the foot. Left and right trap arms are also provided on the clip and have trap ends overlying the foot of the molding in spaced relation therefrom when the molding is in the installed position. Upward movement of the foot causes the foot to engage with the trap ends of the trap arms, trapping the foot against further upward movement.

A further example of a simplified end formed roof ditch molding is depicted in Mourou 2008/0277973 and including a main molding member having a head and an integrally formed beam. The end sections of the beam are removed and the head is contoured and provided with a notch. The end sections are then placed into a plastic injection molding machine whereat the head is folded at the notch, with a shot of plastic deposited adjacent the notch for retention of the fold angle and stiffening of the now formed end caps. A pair of nibs provide engagement with the spring clips at the ends of the roof ditch.

Another design of note is set forth in Hui U.S. Pat. No. 7,045,189 which teaches an automotive molding for closing a recess between a pair of body panels and including a head portion, a stem portion and at least one leg member. The head portion exhibits a width sufficient to close the opening when the molding is installed in the recess. The stem portion can further be formed of a harder plastic material then the leg member and exhibits a width enabling the stem portion to pass through an opening in the recess. The leg member is formed of a softer material and extends from the stem portion for frictional engagement with the side wall of the recess. A living hinge can be formed in the leg member to facilitate deflection of the leg member during insertion.

SUMMARY OF THE INVENTION

The present invention discloses a coextruded molding for mounting within a vehicle roof ditch. The molding includes an elongated trim defining component constructed of a first material. A structurally supporting component is also provided and is constructed of a second harder material coextruded along a surface of the first material.

The structural supporting component also includes a main body terminating at inwardly angled ends so as to define an extending track and a plurality of fasteners seating within the track for mounting the molding to the vehicle roof ditch. Other features include a film material applied over exposed surfaces associated with the first softer material.

The trim defining component may also exhibit a generally rectangular shaped profile with or without an interconnected and angled lower lip. The elongated trim defining component further exhibits an inwardly curled upper edge and a spaced and inner protuberance defining therebetween a support surface against which is coextruded the structurally supporting component.

Additional softer plastic components are coextruded along both an inside surface and opposing/projecting edges of the structurally supporting component. Spaced apart recesses are also defined in a main body of each of the fasteners which align and seat with said additional softer components coextruded along the opposing/projecting and track defining edges of the structurally supporting component.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

The present invention is a coextruded roof ditch molding, such as which replaces previous stainless steel moldings. The coextruded molding is typically produced as a single continuous extrusion which includes both hard and soft components. Specifically, the molding includes an outer flap exhibiting a softer plastic flap or covering material coextruded in a single shot process with a harder and structural supporting thermoplastic further exhibiting an inwardly facing track or channel. A plurality of mounting fasteners seat within the track and assist in mounting the molding to a conventional vehicle roof ditch recess.

Figure 1:
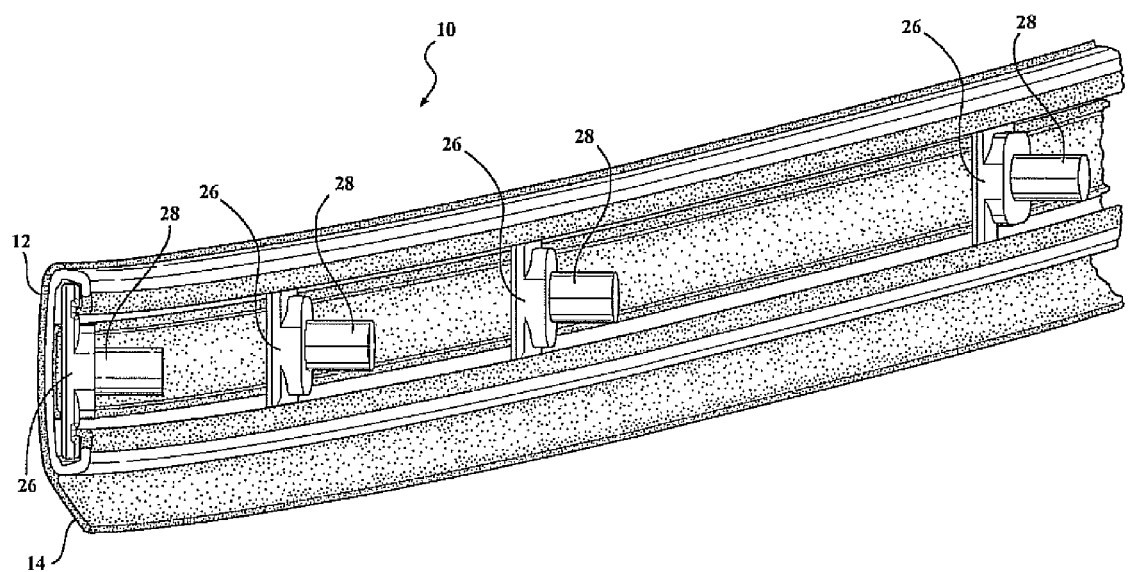
FIG. 1 is a perspective view of the coextruded roof ditch molding according to one non-limiting variant of the present invention.

Referring to FIG. 1, a perspective view is generally shown at 10 of the coextruded roof ditch molding according to one non-limiting variant of the present invention and which depicts a softer and outer/exterior facing material defining a trim piece (exterior facing body) and exhibiting a selected thickness and having an elongated shape consistent with being formed as an extrusion. As further shown, the softer thermoplastic material depicts a generally rectangular shaped profile which, in the example illustrated, includes an elongated body 12 with an interconnected and angled lower lip 14.

Figure 2:
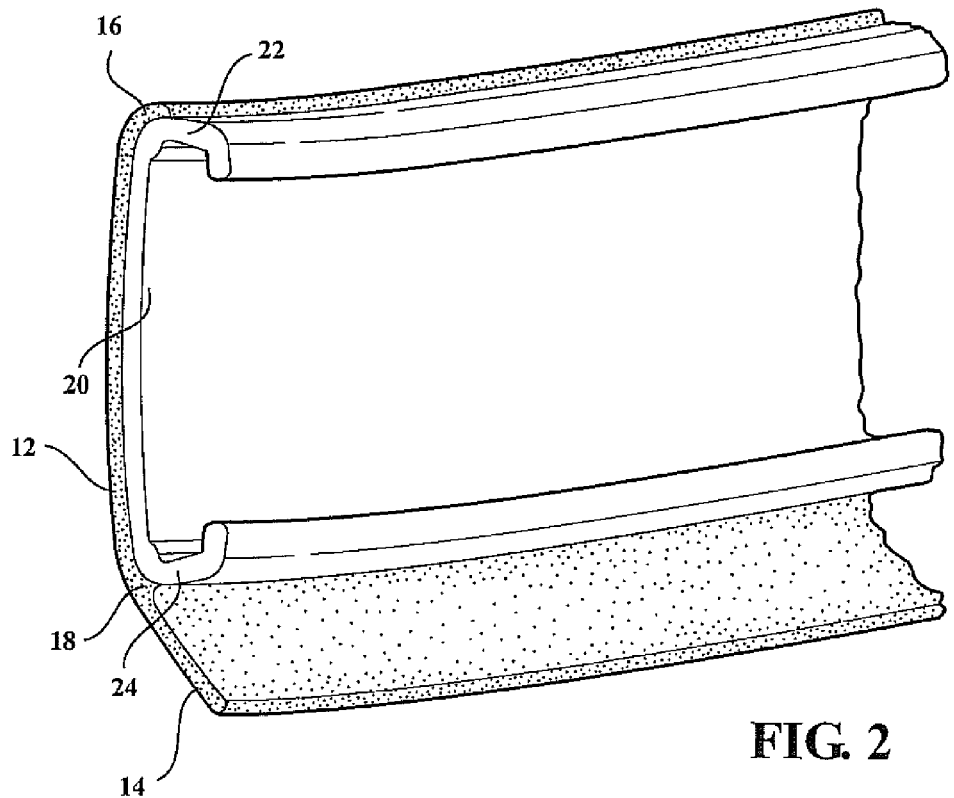
FIG. 2 is an enlarged and rotated view of the coextruded thermoplastic molding depicting the outer/softer flap and inner/structurally supporting channel.
Figure 3:
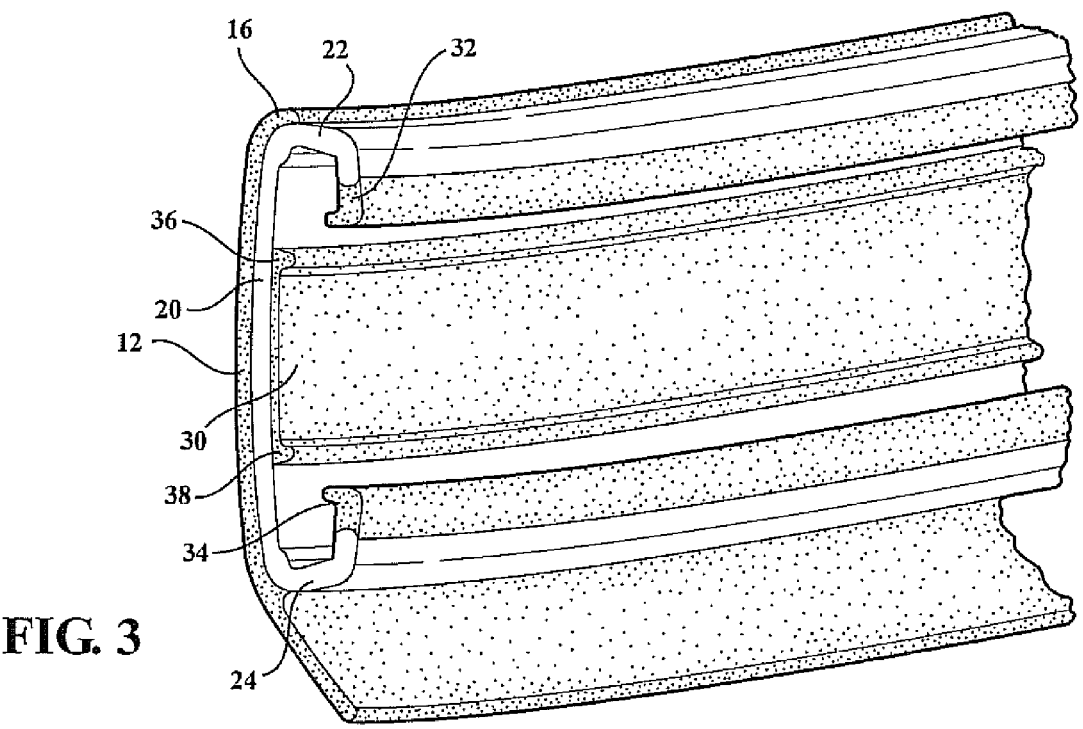
FIG. 3 is a successor view to FIG. 2 and illustrating additional softer plastic components coextruded along both the inside surface and opposing/projecting edges of the track defining harder structural supporting portion.
Figure 5:
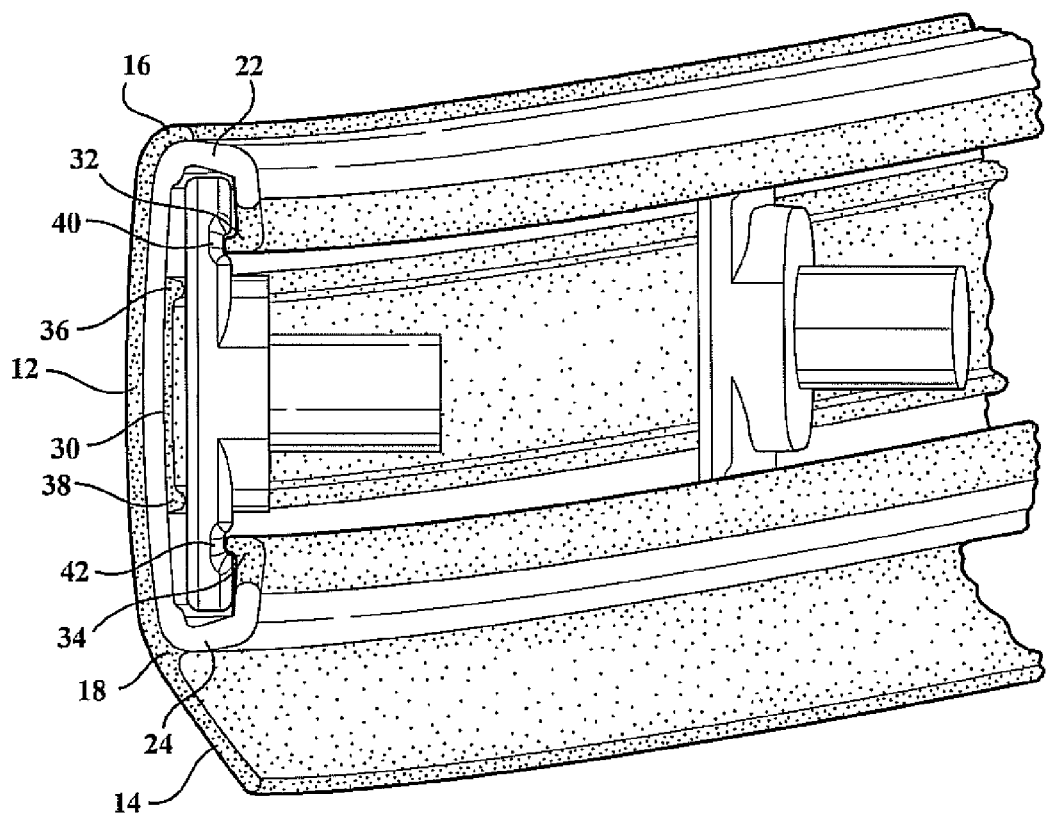
FIG. 5 is a successor view to FIG. 3 and illustrating the manner of installing the mounting fasteners in slidably inserting fashion via open ends of the track defining harder structural supporting portion.

As further best shown from the enlarged and cutaway side perspectives of FIGS. 2, 3 and 5, the exterior facing and softer material further includes, on an inner facing side, both an inwardly curled upper edge 16 and an inner protuberance defusing the location of the angled lower lip 18. The inner facing side of the softer material between the upper edge 16 and lower lip defines a support surface against which is coextruded an inner and harder/structurally supporting thermoplastic component exhibiting a main body 20 and angled/curled upper 22 and lower 24 ends (see again FIGS. 2, 3 and 5), such that the structural supporting component defines a lengthwise extending track or channel for supporting a plurality of mounting fasteners.

Figure 4:
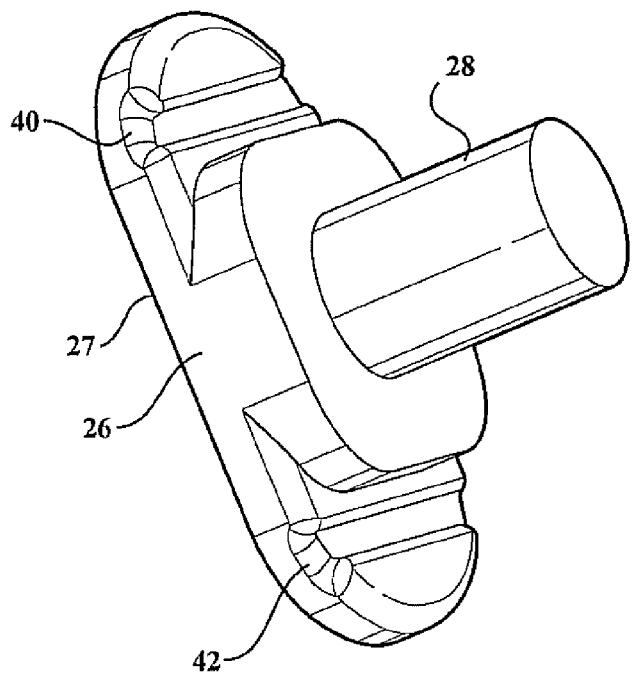
FIG. 4 is an enlarged perspective of a sample mounting fastener utilized with the roof ditch molding.
Figure 6:
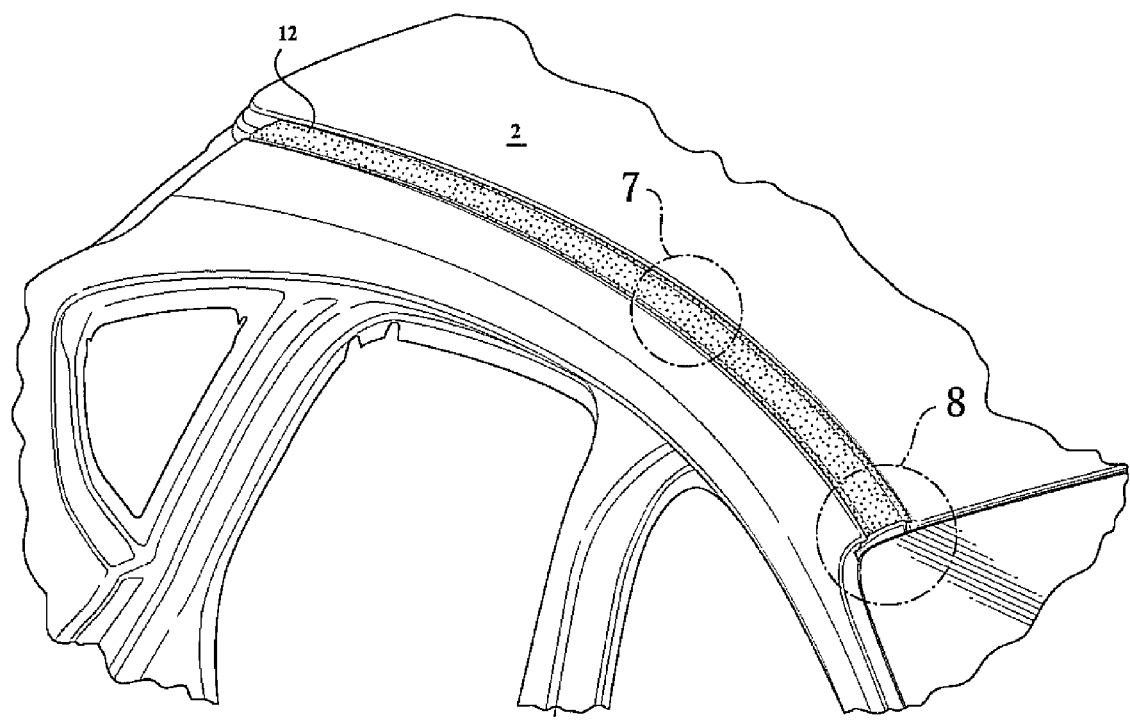
FIG. 6 is a first environmental view of the roof ditch molding installed along a vehicle roof edge.
Figure 7:
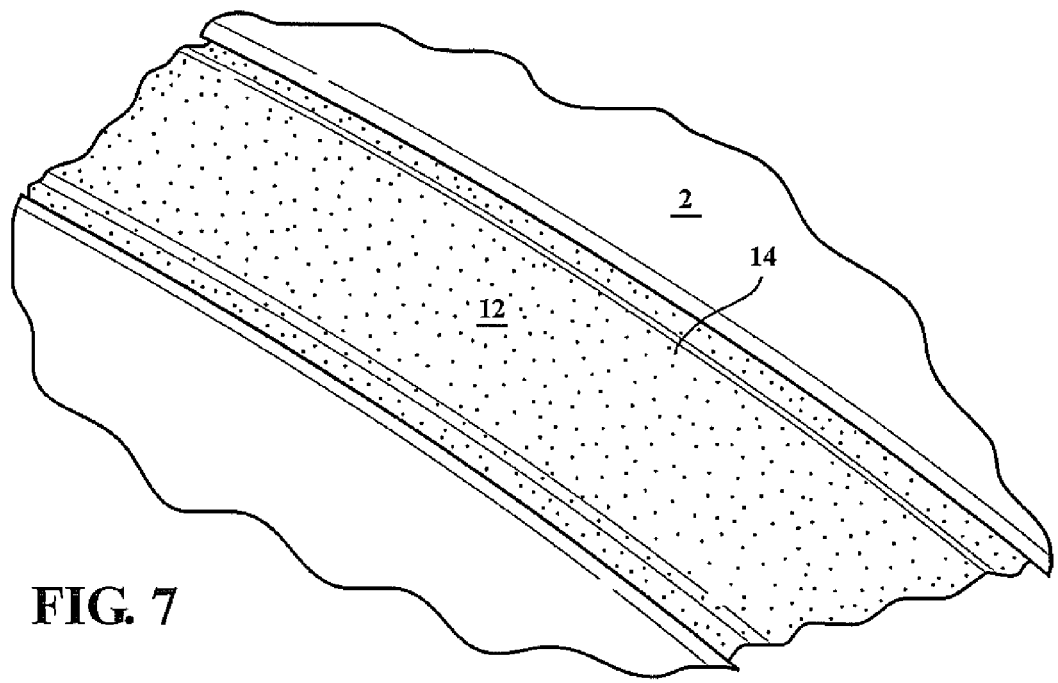
FIG. 7 is an enlarged view of an indicated intermediate portion of the roof ditch molding shown in FIG. 6.

Each of the fasteners, as best shown in FIG. 4, includes a main body 26 dimensioned to exhibit a flattened outer face (at 27 in FIG. 4) for seating in end-wise traversable fashion within the track defined in the structural supporting component. An inner stem 28 (again FIG. 4) associated with each fastener extends from the maid body 26 and, in the inserted view of FIG. 1 as subsequently depicted by the installation views of FIGS. 6-8, secure within a recessed profile associated with a linear extending direction along a 2 of a vehicle, such as between a forward located windshield 4 and rearward window or pillar.

Referring again to enlarged FIGS. 3 and 5, also illustrated are additional softer plastic components coextruded along both the inside surface (at 30) and opposing/projecting edges (further at 32 and 34) of the track defining harder structural supporting portion. The component 30 defines a middle supporting surface extending along the interior of the main body 20 with upper 36 and lower 38 end protuberances for cushioning the rear planar surface 27 of the main fastener body 26.

The additional portions 32 and 34 are coextruded to the ends of the inwardly curled edges of the structural supporting ends 22 and 24, such that the additional softer components 30-38 provide cushioning support to the fasteners 26 when inserted into the track defined channels as best shown in FIG. 5. An inside surface of the track seating body 26 of each of the fasteners includes spaced apart and parallel configured recesses, see at 40 and 42 in FIG. 5, such that the softer inner angled portions 32 and 34 of FIG. 5 seat within the recesses 40 and 42 in a manner which facilitates a smooth and dynamic engagement of the extrusion within the roof ditch during the mounting process. The advantages of this construction include providing an additional degree of give or deflection (as further contributed by the inner surface coextruded softer supporting portions 36 and 38 acting upon the rear planar surfaces 27 of each fastener), thereby minimizing any misalignment during installation, as well as providing a solid fit and finish appearance.

Figure 8:
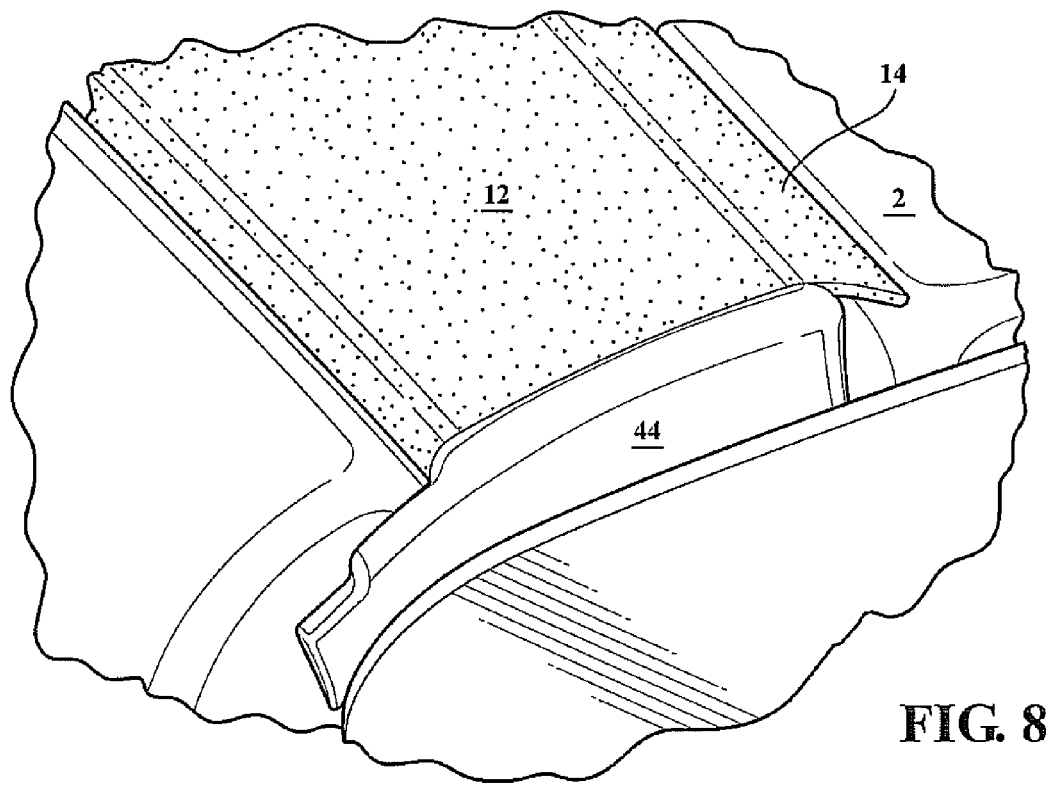
FIG. 8 is a further indicated and environmental corner perspective shown in FIG. 6 and further depicting a sealing cap for closing the inner track profile of the structural supporting portion.

Referring to FIG. 8, a further enlarged and environmental corner perspective is shown of the coextruded profile mounted within the vehicle roof ditch and which further depicts a sealing cap 44 for closing off each of the opposite ends of inner track profile of the structural supporting portion. Without limitation, the cap 44 can be mechanically affixed, heat staked or sonically welded to the ends of the coextruded profile following pre-assembly of a desired number of fasteners and concurrent with assembly to the vehicle roof ditch.

Figure 9:
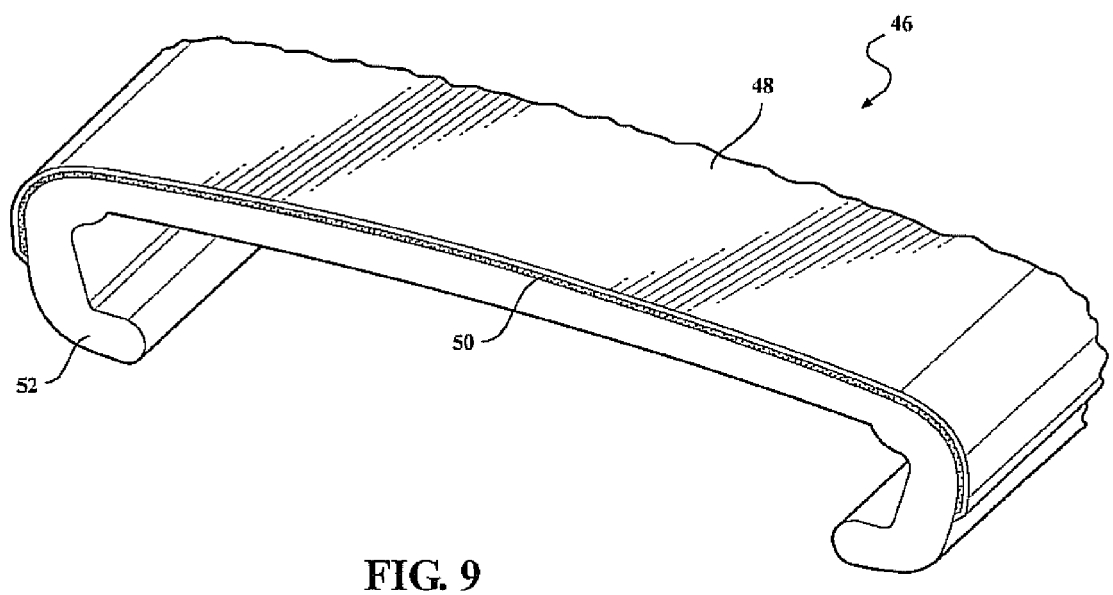
FIG. 9 is a partial perspective of a roof ditch molding according to a further variant and which exhibits a film material that may be applied upon a top surface of the second material defining the elongated body, and such as in order to provide any desired visual or reflective graphic.

Finally, and referring to FIG. 9. a partial perspective is generally depicted at 46 of a roof ditch molding according to a further variant and which exhibits a film material 48 that may be applied upon a top surface of a second (typically soft) material 50 which is molded over an initial hard or rigid material 52 (such as further according to any of the preceding described embodiments) for collectively defining the elongated body. The film material 48 in use provides any desired visual or reflective graphic appearance.

It is further envisioned that the film material 48 can be substituted with any other film, covering, coating or application not limited to that illustrated for purposes of providing any desired visual or decorative effect to the coextrusion. A transparent release film can optionally be provided without limitation over the main film covering.

Having described my invention, other and additional preferred embodiments will become apparent to those skilled in the art to which it pertains, and without deviating from the scope of the appended claims.

We claim:

1. A coextruded molding assembly for mounting within a vehicle roof ditch, said molding assembly comprising:
    an elongated and flexible trim piece exhibiting a generally rectangular shaped profile and having an interconnected and angled lower lip;
    a structurally supporting harder material coextruded with an inside surface of said flexible trim material, said structurally supporting material including inwardly angled ends in end profile so as to define an extending track;
    additional softer plastic components coextruded along each of an inside surface as well as opposing and inwardly projecting edges of said structurally supporting harder material;
    said trim piece further having an inwardly curled upper edge and a spaced and inner protuberance defining therebetween a support surface against which is coextruded said structurally supporting material;

a plurality of fasteners each including a main body dimensioned to seat within the track and adapted for mounting the molding to the vehicle roof ditch; and a pair of spaced apart recesses defined within an underside surface of said main body associated with each of said fasteners, said recesses aligning and seating said inwardly projecting coextruded softer components in combination with said softer plastic component coextruded along said inside surface of said structurally supporting material in contact with an outer surface of said fastener main body in order to provide for misalignment deflection during installation of said fasteners within the track.

2. The molding assembly as described in claim 1, further comprising a film material applied over exposed surfaces associated with said trim piece.

3. The molding assembly as described in claim 1, further comprising a sealing cap for closing off each of opposite ends of an inner track profile established by the structurally supporting harder material.

4. The molding assembly as described in claim 1, said softer plastic component coextruded along said inside surface of said structurally supporting harder material further comprising an elongate rectangular strip material exhibiting at least one projecting location.

* * * * *